United States Patent [19]
Rynkowski

[11] 4,079,240
[45] Mar. 14, 1978

[54] ASYNCHRONOUS TO SYNCHRONOUS CONVERTER

[75] Inventor: Gerald A. Rynkowski, Mount Clemens, Mich.

[73] Assignee: Schiller Industries, Inc., Troy, Mich.

[21] Appl. No.: 655,368

[22] Filed: Feb. 5, 1976

[51] Int. Cl.² .................... G06K 7/14; G06F 7/38
[52] U.S. Cl. ............................. 235/466; 235/92 DP
[58] Field of Search ............... 235/61.11 E, 61.7 B, 235/61.12 N, 61.11 D, 92 DP, 92 BN; 340/146.3 Z, 149 A; 250/568

[56] References Cited
U.S. PATENT DOCUMENTS

| | | | |
|---|---|---|---|
| 3,723,710 | 3/1973 | Croose | 235/61.11 E |
| 3,763,353 | 10/1973 | Nassimbene | 235/61.11 E |
| 3,860,792 | 1/1975 | Myren | 235/61.6 R |
| 3,864,548 | 2/1975 | O'Neil | 235/61.11 E |
| 3,891,831 | 6/1975 | Coles | 235/61.11 E |
| 3,916,154 | 10/1975 | Hare | 235/61.11 E |

Primary Examiner—Robert M. Kilgore
Attorney, Agent, or Firm—Reising, Ethington, Barnard

[57] ABSTRACT

An asynchronous to synchronous converter is disclosed which produces clock pulses in synchronism with data bits of a non-return-to-zero (NRZ) code having a variable data rate. The converter is established adapted for use in optical reading of the Universal Products Code (UPC) code symbol which is of bar code format. The converter comprises a high level bit clock system for clocking the dark bar bits and a low level bit clock system for clocking the light bar bits. A high level measurement circuit times the single bit dark bar pulses and sets the timing for the low level bit clock system and a low level measurement circuit times the single bit low level pulses and sets the timing for the high level bit clock system. The converter receives asynchronous serial data and produces a clock pulse for each bit of the data pulse so that the serial data may be decoded.

4 Claims, 12 Drawing Figures

ASYNCHRONOUS TO SYNCHRONOUS CONVERTER

FIELD OF THE INVENTION

This invention relates to data processing and, more particularly, it relates to means for generating clock pulses in synchronism with asynchronous data bits. This invention is especially adapted for use in processing serial data which is encoded in a non-return-to-zero (NRZ) binary code.

BACKGROUND OF THE INVENTION

Automatic data processing systems have been proposed for use at the point-of-sale in retail business establishments, especially in supermarkets. Such a system is based upon the use of coded labels on each item of merchandise with a label reader at the check-out counter. The label reader, which includes an optical scanner, is interconnected with a central data processor and with an automatic cash register at the check-out counter. This system permits computer control of price information, inventory records and other functions useful in the business operation.

With a view toward such automatic data processing, a machine readable code symbol has been adopted by the Uniform Products Code Council for the Grocery Industry Universal Products Code (UPC). This UPC symbol is of bar code format and is adapted for reading by optical scanning apparatus.

When the UPC code symbol is read by an optical scanner, a video processor produces a stream of serial data which is in the form of a non-return-to-zero (NRZ) code having a wide dynamic range of bit width or bit time. The bit time in this code may vary from one code label to another and may also vary within a single code label, for reasons which will be discussed below. Accordingly, decoding cannot be performed without some means for determining whether a long time interval between transitions between the zero and one levels represents a single bit time at a relatively low data rate of plural bit times at a higher data rate. To successfully decode such a data signal it is necessary to provide some form of demarcation of the bit times regardless of variations in the data rate.

This invention is addressed to the problem of decoding an NRZ code with a variable data rate, i.e. a digital code wherein there is not necessarily a transition from one signal level to another for each data bit and wherein the bit time may vary over a wide dynamic range.

THE PRIOR ART

In the prior art, it has been proposed to decode NRZ encoded data by self-clocking techniques. Such an arrangement is disclosed in the Crouse et al U.S. Pat. No. 3,723,710 in which the bar code is scanned and leading and trailing edge displacements are compared with a standard displacement, such as the narrowest bar of the code, and the displacements are categorized in respect to the standard so that sequential categories define the encoded data. Another self-clocking arrangement is disclosed in the Mak U.S. Pat. No. 3,238,501 in which clocking pulses are initiated by each input data bit so that a nonuniform data rate does not interfere with data transfer. In the Dobras U.S. Pat. No. 3,891,829 a bar code reader is disclosed wherein the bar code includes timing marks which provide a time reference for scanning of the data bars to compensate for the change of speed of scanning.

Another prior art technique called enhanced NRZ utilizes a parity bit added to a basic group of data bits to insure a transition rate in the data sufficient for maintaining lock in a phase-locked loop which is used to generate an external clock. This technique is referred to in Electronic Data News, Aug. 20, 1974 at page 75. The O'Neil U.S. Pat. No. 3,864,548 discloses a system in which a clock pulse generator is automatically synchronized to the rate of scanning of a coded label.

Another known form of self-clocking code is represented by the Goodfinger et al U.S. Pat. No. 3,887,793. In the system disclosed by this patent, a bar code is comprised of wide and narrow segments which represent the binary states of the code. Similar systems are disclosed in the Wolff U.S. Pat. No. 3,744,026 and the Vanderpool et al U.S. Pat. No. 3,778,597 which describe decoding of a bar code by width comparison with a reference bar or a previous bar of the code. A wide bar represents one binary state and a narrow bar represents the other.

SUMMARY OF THE INVENTION

According to this invention, an NRZ code with a variable data rate is provided with clock pulses in synchronism with the data bits by an asynchronous to synchronous converter. Representative of this type of code is the UPC code symbol in which binary 1's and 0's are represented by dark bars and light bars of equal width, with no spacing between successive bars. Each code symbol includes a set of guard bars at the beginning and end of each symbol with each guard bar being one bit wide.

The asynchronous to synchronous converter receives asynchronous serial data and produces clock pulses for each bit of a data pulse, both high and low, i.e. produced by a dark or a light code bar. This is preferably accomplished by a bit clock generator system which includes a cascade arrangement of bit clock generators, the first of which is set to produce a clock pulse a fixed time delay after the leading edge of a data pulse, the time delay being equal to about one-half of a bit time for the maximum data rate. The output of each bit clock generator is connected with the input of the succeeding generator and each generator, except the first, has a delay time of twice the delay time of the first, provided that the data rate remains constant. A high level bit clock system responds to the binary one pulses to provide the corresponding clock pulses and a low level bit clock system responds to the binary zero pulses to provide the corresponding clock signals for each bit.

Nonuniform or variable data rate is compensated for by adjusting the delay time of all the bit clock generators except the first. This is accomplished by measuring the bit time of single bit pulses in the guard bars, and in the encoded data for updating, and increasing the delay time of the bit clock generators, except the first, in proportion to the single bit time. This is accomplished using a count and latch circuit to perform the measurement and supply the delay time to the bit clock generators. One count and latch circuit measures single dark bar widths to determine the delay time for the low level bit clock system and another count and latch circuit measures the single light bar widths for use in the high level bit clock system. A standard UPC label includes many single bit width bars and the delay times for the bit clock generators are updated many times during a reading of each label.

DETAILED DESCRIPTION

A more complete understanding of this invention may be obtained from the detailed description that follows taken with the accompanying drawings in which.

The invention will be described with reference to an illustrative embodiment which is especially adapted for use in decoding the UPC code. It will be appreciated, as the description proceeds, that the invention is applicable to decoding other similar NRZ codes with variable or nonuniform data rates.

Environment of the Invention

Figure 1:
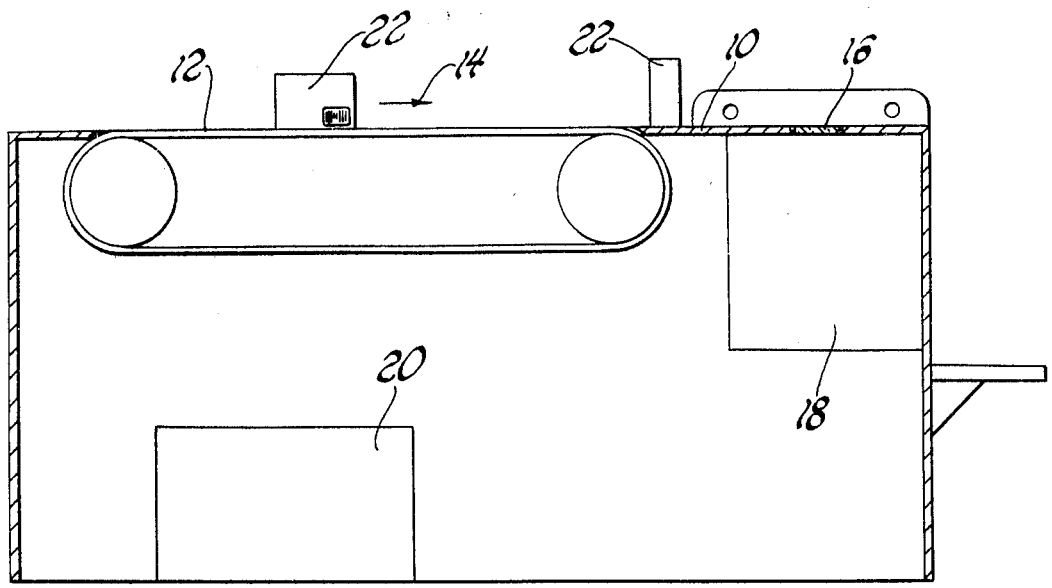
FIG. 1 shows a check stand equipped with a code label reader.

In the typical supermarket installation for point-of-sale data processing, an optical reader is installed in the checkout counter and a UPC code symbol is applied to each article of merchandise to be processed. Such an installation is depicted in FIG. 1 which shows a check-out counter. The counter includes a counter top 10 which the check-out cashier uses as a work surface for processing the articles of merchandise being sold. A conveyor 12 may be provided in the counter top to advance the articles in the direction of the arrow 14. The counter top 10 is provided with a transparent window 16 and a scanner head 18 is mounted under the counter top with a scanning field of view extending through the window. A controller 20 for the scanning head is suitably disposed beneath the counter. In processing the articles, such as packages 22, they are moved one by one by a human operator across the window 16 with the code symbol thereon in the field of view of the scanner head.

Figure 2:
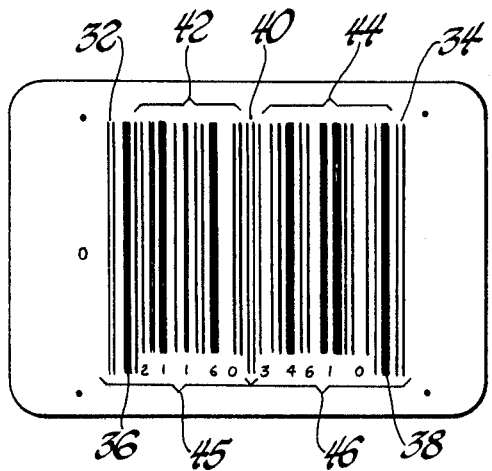
FIG. 2 shows a typical UPC code symbol.

The UPC code symbol is of rectangular bar code format and a typical example is illustrated in FIG. 2. The code symbol, as illustrated, is printed on a label which is affixed to the package of the merchandise to be processed. The code label has encoded data in a code field of predetermined format. The label 26 and hence the code field may be passed over the window 16 in any angular orientation so long as the scanning beam can impinge upon the code field. The label may be flat against the window or it may be tilted out of the plane of the window. A scan pattern is produced so that the encoded data will be read regardless of the orientation of the code field relative to the window.

The code symbol is in the form of a series of parallel light and dark bars of different widths for machine reading of the encoded data, together with the equivalent numeric characters in human readable form at the bottom of the code bars. The overall shape of the code field is rectangular. Each character or digit of the code is made up of seven data elements or modules which might be dark or light. The left-hand and right-hand margins of the code symbol are light spaces and are at least seven modules wide. Each module represents a binary digit, with the dark bar being a binary 1 and the light bar being a binary 0. A left-hand guard bar pattern 32 and a right-hand guard bar pattern 34 provide side boundaries for the other code bars. Each guard bar pattern is in the form of a dark module, a light module and a dark module which encodes the binary digits 1,0,1. Each character of code is made up of seven modules and is represented by two dark bars and two light spaces with each dark bar being made up of 1, 2, 3 or 4 dark modules. It is significant to note that this terminology distinguishes between bars and binary digits or bits. Each bar, whether light or dark, is made up of one or more modules and hence represents one or more bits. The tall bars 36 represent the number system character and the tall bars 38 represent a module check character. The central tall bars 40 serve as guard bars and separate six characters of code 42 on the left-hand side from six characters of code 44 on the right-hand side. The tall bars 40 are in the pattern of a dark module, a light module and a dark module, and thus encode the binary digits 1,0,1, the same as the guard bar pattern. A left-hand code field 45 comprises guard bars 32, number system bars 36, information code bars 42 and central bars 40; a right-hand code field 46 comprises central bars 40, information code bars 44, modulo check bars 38 and guard bars 34. Other versions of the UPC standard symbol contain either single or double code fields. The normal size of the version of the UPC code symbol shown is about 1.3 inches by about 0.9 inches. However, the symbol size is variable within a magnification range from 0.8 to 2.0. Thus, it will be understood that the width of a single module, i.e. single bit, code bar will be different for different code symbols. Furthermore, a given code symbol may be presented at the scanning window at such an angle relative to the window that a single bit width bar in one part of the symbol will appear to the scanning trace to have a different width than a single bit width bar in a different part of the code symbol.

The optical scanner will acquire data at a variable rate because of the nonuniformity of bar width representing a single bit. It is noted that the speed of movement of the code symbol relative to the scanning window is small relative to the spot speed of the scanning beam. Therefore, even though the code symbol speed is nonuniform it does not result in significant variation in bit width. It is further noted, however, that this invention is adapted to compensate for variations in bit widths over a wide dynamic range regardless of the cause of such variation.

The Overall System

Figure 3:
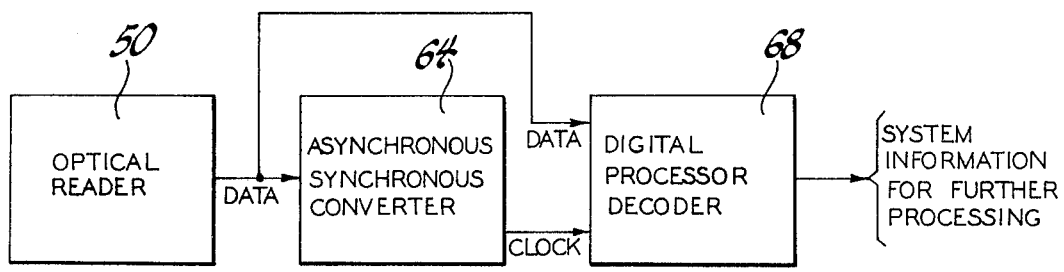
FIG. 3 is a block diagram showing the environment of the invention.
Figure 4:
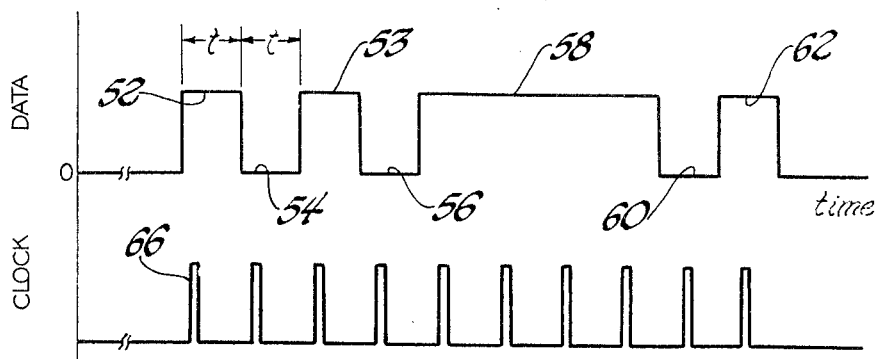
FIG. 4 is a timing diagram showing data and clock pulses.

As previously stated, the asynchronous to synchronous converter of this invention accepts nonsynchronous data and generates clock pulses in synchronism with the data bits. A typical system is illustrated in the block diagram of FIG. 3. An optical reader 50 comprising a scanner and video processor produces an electrical data signal. The data signal, as depicted in FIG. 4, is made up of a train of pulses which vary in width and spacing according to the code symbol being scanned by the optical reader. In FIG. 4, the example code signal is that produced by a portion of a UPC code symbol which includes the guard bars and the left-side character number "3". It is noted that the signal is at a high or logical 1 level during the interval that the scanning beam encounters a dark code bar and it is at a low or logical 0 during those intervals that the scanning beam encounters a light code bar. The single bit dark code bar produces a pulse 52 which has a single bit width or bit time, t, of logical level 1. Similarly, a single light code bar produces a pulse 54 which has a bit width or bit time, t, of logical 0 level. In the case of an ideal code symbol, the dark bars and light bars representing the same number of bits are of exactly the same width but, in practice, this is not achieved due to printing techniques. The guard bar pattern of the code signal is a prefix represented by the dark pulse 52, the light pulse 54 and the dark pulse 53, each of which is of a single bit width. The character number "3" is represented by a light pulse 56 which is one bit wide, followed by a dark pulse 58, which is four bits wide, which in turn is followed by a light pulse 60 one bit wide and a dark pulse 62 one bit wide. As shown in FIG. 3, this data stream in serial form is applied to the input of the asynchronous to synchronous converter 64 of this invention. The converter produces a clock signal as indicated in FIG. 4 which comprises a train of clock pulses 66 which are generated in timed relationship with each data bit of the data signal. The clock pulses are applied to the input of a digital processor 68 along with the data signal for decoding.

Figure 5:
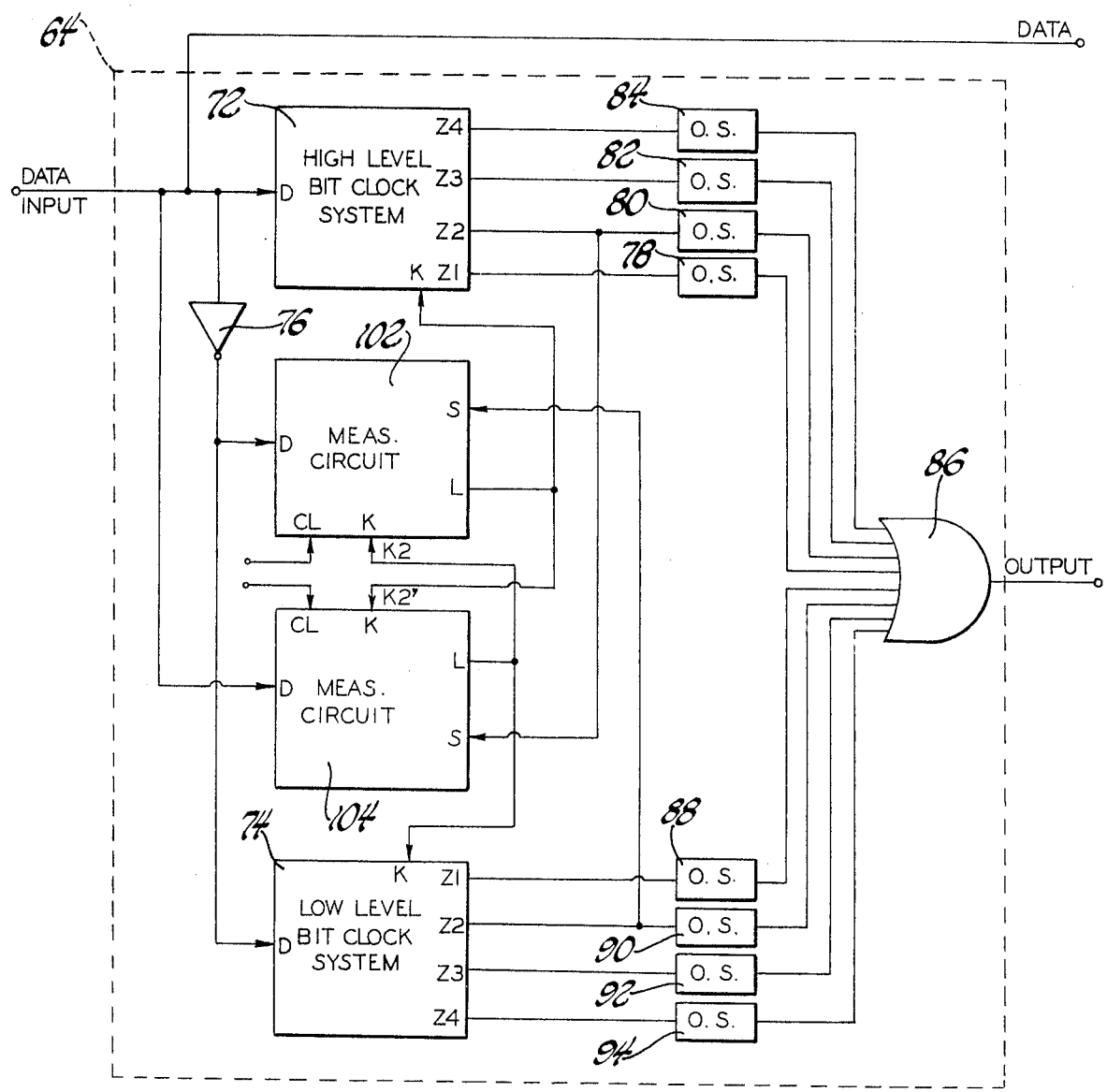
FIG. 5 is a block diagram of the inventive converter.

The asynchronous to synchronous converter 64 is depicted in block diagram in FIG. 5. In general, the converter comprises a high level bit clock system 72 and a low level bit clock system 74. The data signal is applied directly to the input of the high level bit clock system 72 and it is applied through an inverter to the input of the low level bit clock system 74. The high level bit clock system is adapted, by means which will be described below, to produce an output pulse on output Z1 in timed relation with any high level data pulse which is one or more bits wide. It produces an output pulse on output Z2 in response to any input data pulse which is two or more bits wide. Similarly, an output pulse is produced on output Z3 and Z4 for any input data pulse which is three or more bits wide or four or more bits wide, respectively. The outputs Z1, Z2, Z3, and Z4 are connected, respectively, with the inputs of one-shot multivibrators 78, 80, 82 and 84. The one-shot multivibrators produce clock pulses 66 (see FIG. 4) and the outputs thereof are applied, respectively, to the inputs of an OR gate 86. The output of the OR gate is connected with the input of the digital processor 68 to apply the clock pulses thereto. The low level bit clock system 74 is the same as the high level system 72; the outputs Z1, Z2, Z3 and Z4 are connected, respectively, to the inputs of the one shot multivibrators 88, 90, 92 and 94. The outputs of the one shot multivibrators are connected, respectively, with inputs of the OR gate 86. A clock pulse is supplied through the OR gate 86 in timed relation with each bit of the data signal.

The asynchronous to synchronous converter 64 further comprises a measurement circuit 102 and an identical measurement circuit 104. The measurement circuits are adapted, by means which will be described below, to measure the width of each single bit pulse, such as the guard bar pulses, and supply that measurement to one of the bit clock systems as a calibration or reference width. For this purpose, the data signal is applied directly to the input D of the measurement circuit 104. The output of the measurement circuit 104 is applied to the K input of the low level bit clock system 74. The measurement circuit 104 has an input K which is connected with the output of the measurement circuit 102. For purposes to be described below, a strobe input, S, on the measurement circuit 104 is connected with output Z2 of the high level bit clock system 72. As will be described further below, the measurement circuit 104 produces an output corresponding in value to the width of the last received, high level, single bit pulse in the data signal and supplies this output to the low level bit clock system 74. Similarly, the measurement circuit 102 produces an output corresponding in value to the width of the last received, low level, single bit pulses in the data signal and supplies this output to the high level bit clock system 72.

Bit Clock Generators

Figure 6:
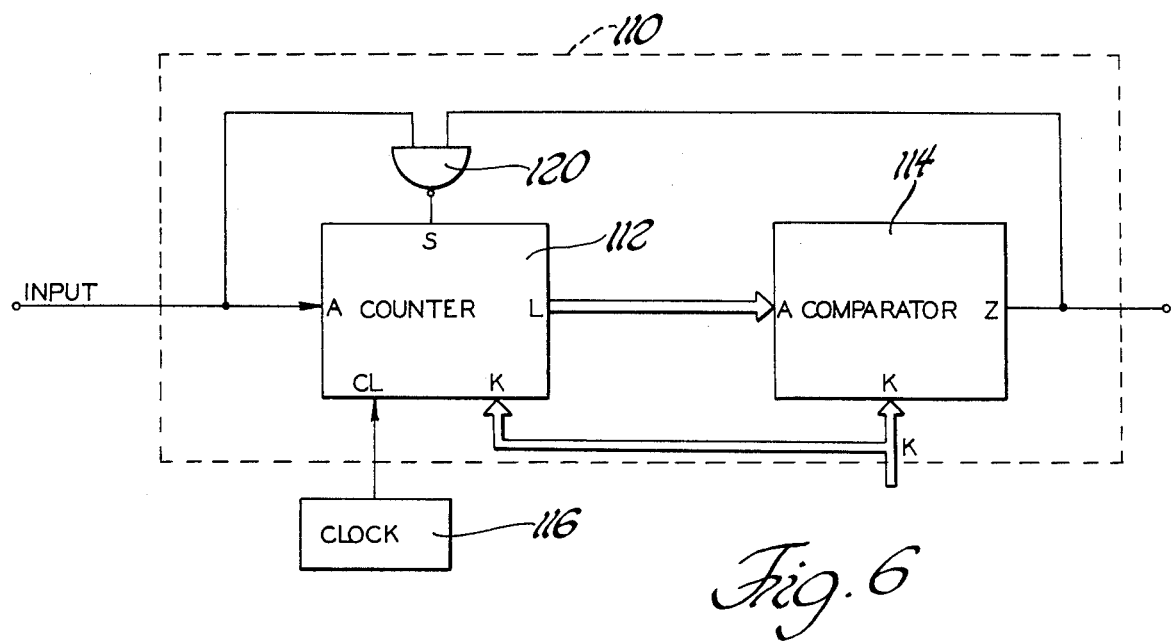
FIG. 6 shows a bit clock generator.

FIG. 6 shows one of the bit clock generators used in combination in each of the bit clock systems referred to in connection with FIG. 5. The bit clock generator 110 comprises a presettable binary counter 112 and a digital comparator 114. The presettable counter 112 has a clock input, CL, which is connected with the output of a master clock 116. The counter also has an enabling input A which, in response to a high input, causes the counter to start counting and resets the counter in response to low input. The clock 116 generates a high frequency clock pulse train having, for example, the frequency of 20 MHz. The clock pulses are used to measure the width of the input data pulses; for this purpose, when the input signal goes high the counter starts counting the clock pulses applied by the clock 116. The counter is preset by a binary word applied to a preset input K and the counter produces an output word at output L which is equal to the clock count until the count reaches the value of the input word at input K. At this count, a strobe signal is applied to a strobe input, S, of the counter 112, by means which will be described presently, and the strobe signal causes the counter output L to remain at the value of the input word at preset input K. The output L of the counter is connected with the input A of the comparator 114. The comparator is a binary, bit-by-bit comparator which has an input K of the parallel type which receives an input word equal in value to the preset count of counter 112. The comparator has an output, Z, which is low so long as the input A is less than the input K; however, the output Z goes high when the input A equals input K and it remains high while the input A is greater than input K. Accordingly, the output Z goes high when the number of clock pulses from the clock 116 is equal to the preset count at input K. The output Z of the comparator is connected to one input of a NAND gate 120 which has its other input connected with the input A of the counter 112. Accordingly, when the output Z of the comparator goes high with the other input of the NAND gate 120 high due to the input data pulse to the counter 112, the NAND gate 120 goes low and strobes the counter. Strobing the counter causes the value of the preset input K to appear at the output L and remain there so long as the output of the NAND gate 120 remains low, which it will do so long as the input data pulse remains high. When the input data pulse goes low the counter 112 is reset and the output of the NAND gate 120 goes high.

The bit clock generator 110 may be regarded in block diagram form as indicated by the dashed lines in FIG. 6. As such, the bit clock generator has a data input A, a clock input CL and a preset input K, and an output Z.

The bit clock generator operates, as described above, so that the output is low so long as the input signal at input A is low. The output goes high only after a high input pulse is applied to the input A for a time duration equal to the preset time interval at input K. The output will remain high so long as the input pulse at input A remains high and will go low when the input pulse goes low.

Bit Clock Systems

Figure 7:
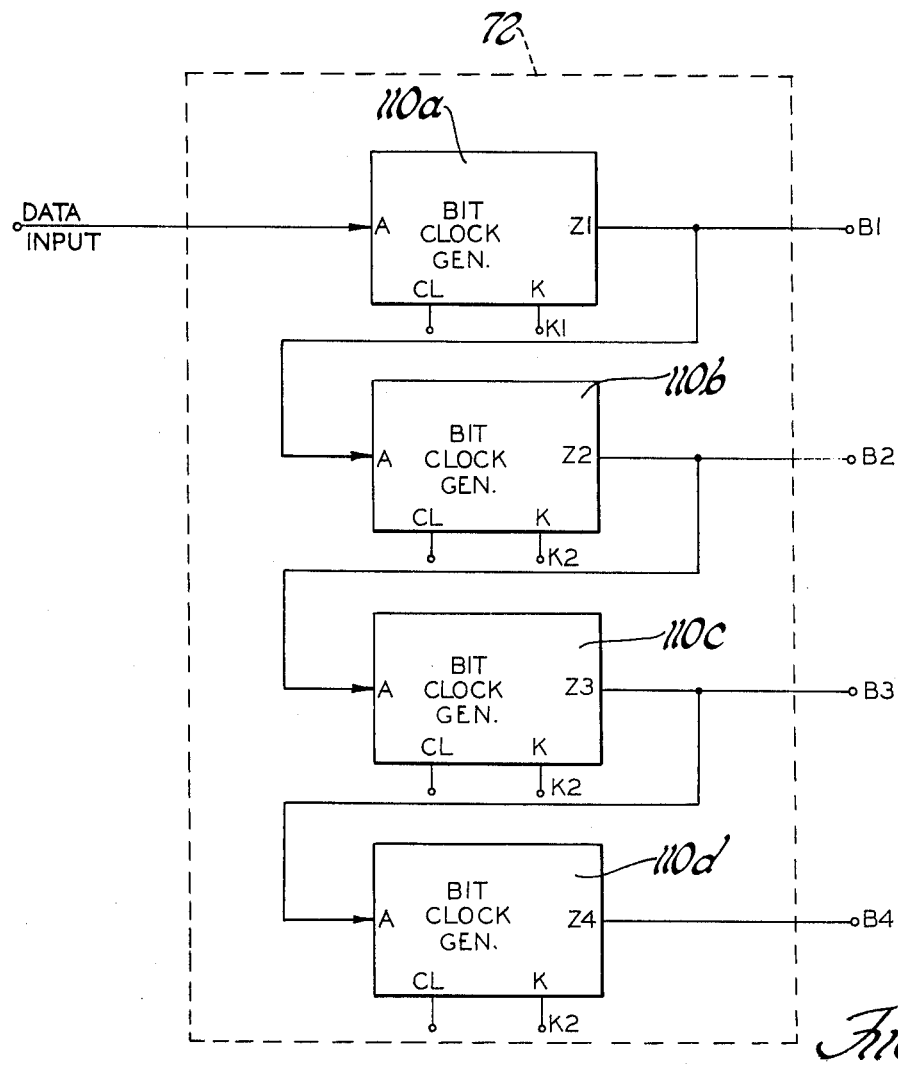
FIG. 7 shows a bit clock system.
Figure 8:
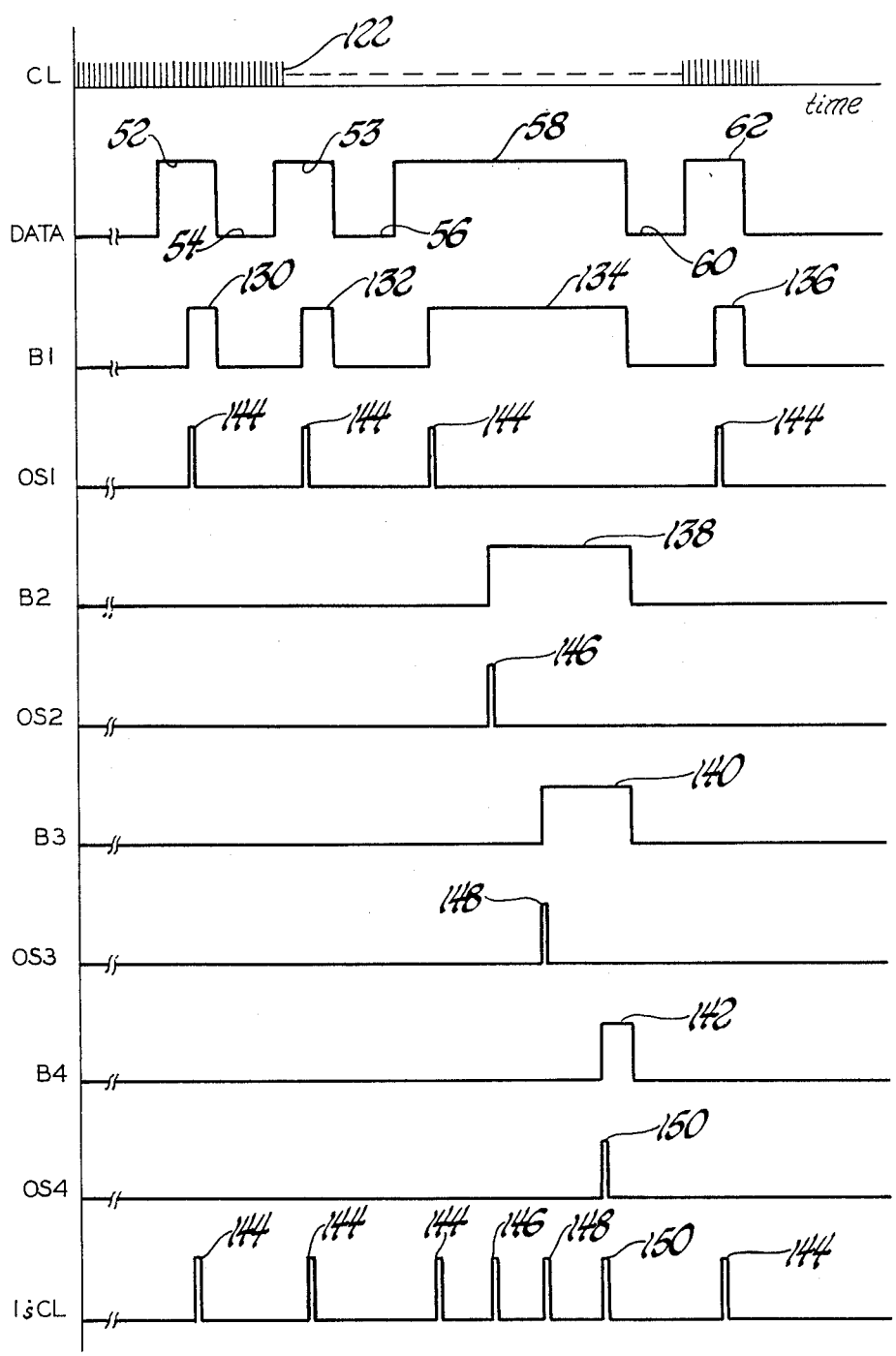
FIG. 8 and FIG. 9 are timing diagrams for explanatory purposes.

FIG. 7 shows the high level bit clock system in detail and it will be described with reference to the timing diagram of FIG. 8. It will be understood that the low level bit clock system 74 is the same as the high level bit clock system.

As shown in FIG. 7, the bit clock system 72 comprises a set of bit clock generators 110a, 110b, 110c and 110d, each of which is identical to the bit clock generator described with reference to FIG. 6. The bit clock generator 110a receives the data signal at its input A. The clock 116 is connected with the clock input CL and a preset count corresponding to the desired time delay interval, for example 5 clock pulses, is applied to the preset input K. The output Z1 of the generator 110a produces an output timing signal B1. The bit clock generators are connected in cascade relation and, accordingly, the output Z of the bit clock generator 110a is connected to the input A of bit clock generator 110b. Similarly, the output Z2 of bit clock generator 110b is connected with the input A of bit clock generator 110c and the output Z3 of generator 110c is connected with the input A of generator 110d. Clock 116 is connected with the clock input CL of all of the bit clock generators.

As mentioned above, each of the bit clock generators has a preset input K in the form of a binary word which is equal to a predetermined time interval. This predetermined time interval is selected in accordance with the maximum expected data rate or the smallest expected value of bit time in the input data signal. In the illustrative embodiment of the invention, the maximum expected bit rate, for example, is two mega-bits per second, which corresponds to a bit time of 0.5 microseconds. With the clock frequency of clock 116 set at 20 MHz., there are 20 clock pulses per microsecond or 10 clock pulses per bit time. For the first generator 110a, it is desirable to set the preset input of the counter at a time duration equivalent to one-half bit time which, in the example given is equal to 5 clock pulses from the clock 116. Accordingly, the input quantity K1 is 5 clock pulses. The preset inputs K of the bit clock generators 110b, 110c and 110d are preset to time interval values equal to a full bit width at the highest expected bit rate. In the example, an input quantity K2', which is equal to 10 clock pulses, is applied to the preset inputs K of the generators 110b, 110c and 110d.

The operation of the bit clock system 72 will be described with reference to the timing diagram of FIG. 8. In this diagram, the example data signal is the same as that of FIG. 4; it includes a guard bar pattern comprising dark bars 52 and 53 and a light bar 54, all of which are one bit wide. It also includes the code for character number "3" which comprises a light bar 56 of single bit width, a dark bar 58 of four bits in width, light bar 60 of one bit width and dark bar 62 of one bit width. For purposes of explanation, the input data signal is assumed to be uniform in time and occurs at the highest expected bit rate which, in the example, is two megabits per second. The clock 116 supplies a clock signal CL comprising clock pulses 122 as shown in FIG. 8. The dark pulse 52 will cause the output Z of bit clock generator 110a to go high after five clock pulses and remain high until the data pulse 52 goes low. This produces a first pulse 130 of the timing signal B1. The dark bar pulse 53 produces a similar pulse 132. The long dark bar pulse 58 also causes the output Z of the bit clock generator 110 to go high after five clock pulses and it remains high until the dark bar pulse 58 goes low, thus producing the long pulse 134 in the timing signal B1. The dark bar pulse 62 produces a pulse 136 which is the same as pulses 130 and 132.

The timing signal B1 is applied to the input A of the bit clock generator 110b. This generator operates the same as bit clock generator 110a except that the preset time delay interval is equivalent to ten clock pulses from clock 116. Accordingly, the pulse 130, having a duration less than ten clock pulses, will have no effect on the output Z2 of the generator 110b and the timing signal B2 will remain low. The same result is obtained from the pulse 132 of timing signal B1. However, the pulse 134 has a duration longer than ten clock pulses and therefore the output Z2 of generator 110b will go high ten clock pulses after its leading edge is applied to the input A and it will remain high until the pulse 134 goes low. This produces the pulse 138 in the timing signal B2. The pulse 136 of timing signal B1, being less than ten clock pulses long, has no effect on the output of generator 110b and the timing signal B2 remains low. The timing signal B2 is applied to the input A of the bit clock generator 110c which also has a preset quantity K2 of 10 clock pulses applied to its preset input K. Accordingly, the output Z3 of the generator 110c will remain low until ten clock pulses after the leading edge of the pulse 138 of timing signal B2. At this time the output Z3 goes high and it will remain high until the pulse 138 goes low. This produces a pulse 140 in the timing signal B3. The timing signal B3 is applied to the input A of the bit clock generator 110d which also has a preset input of ten clock pulses. Accordingly, the output Z4 of generator 110d remains low until ten clock pulses after the leading edge of the pulse 140 of the timing signal B3. At this time the output Z4 goes high and it will remain high until the pulse 140 goes low. This produces a pulse 142 in the timing signal B4.

Referring back to FIG. 5, it is noted that the outputs Z1, Z2, Z3 and Z4 are connected respectively to the inputs of one shot multivibrators 78, 80, 82 and 84. The timing signals B1, B2, B3 and B4 are applied to the respective oneshots, each of which produces a short duration clock pulse in response to each timing pulse. The clock pulses are serially combined to form the output clock signal of the asynchronous to synchronous converter. The FIG. 8 depicts the output clock pulses of the one shot multivibrators in timed relation with the timing signals. The positive transition of each pulse in the timing signal B1 causes the one shot multivibrator 78 to produce a clock pulse 144. This produces the pulse train OS1. Similarly, this positive transition in the timing signal B2 causes the one shot multivibrator 80 to produce a clock pulse 146 in a pulse train OS2. In a similar manner one shot multivibrators 82 and 84 produce clock pulses 148 and 150 respectively in the respective pulse trains OS3 and OS4.

The pulse trains OS1, OS2, OS3 and OS4 are combined by the OR gate 86. This combination of clock pulses is produced by the dark bars of the data signal and is shown in FIG. 8 as the 1's clock signal, 1's CL.

Figure 9:
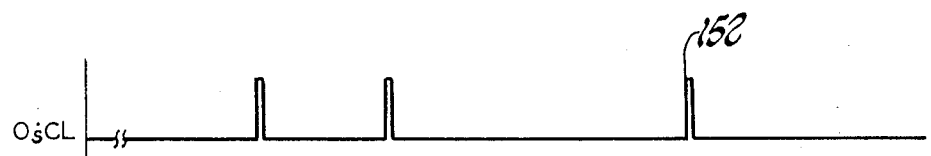

It will now be understood that the low level bit clock system 74 operates in exactly the same manner as the high level bit clock system; the input to the low level bit clock system is the inverse of that applied to the high level bit clock system and accordingly the outputs are complementary. As a result, the low level bit clock system 74, taken with the associated one shot multivibrators 88, 90, 92 and 94 will produce a clock pulse for each light bar bit of the data signal. These clock pulses are combined by the OR gate 86 and comprise a 0's clock signal, 0's CL, which is depicted in FIG. 9. The 1's clock signal of FIG. 8 and the 0's clock signal of FIG. 9 are combined by the OR gate 86 and produce the clock signal output of the asynchronous to synchronous generator.

Measurement Circuits

As discussed above, the asynchronous to synchronous converter of this invention is adapted to provide clock pulses for asynchronous data which is supplied at a variable data rate, i.e. nonuniform bit time. For this purpose, the measurement circuits 102 and 104, referred to in connection with FIG. 5, are provided to obtain a measure of bit time. The measurement circuits 102 and 104 are identical, except for an initializing or set-up circuit associated with measurement circuit 102, as described below.

Figure 10:
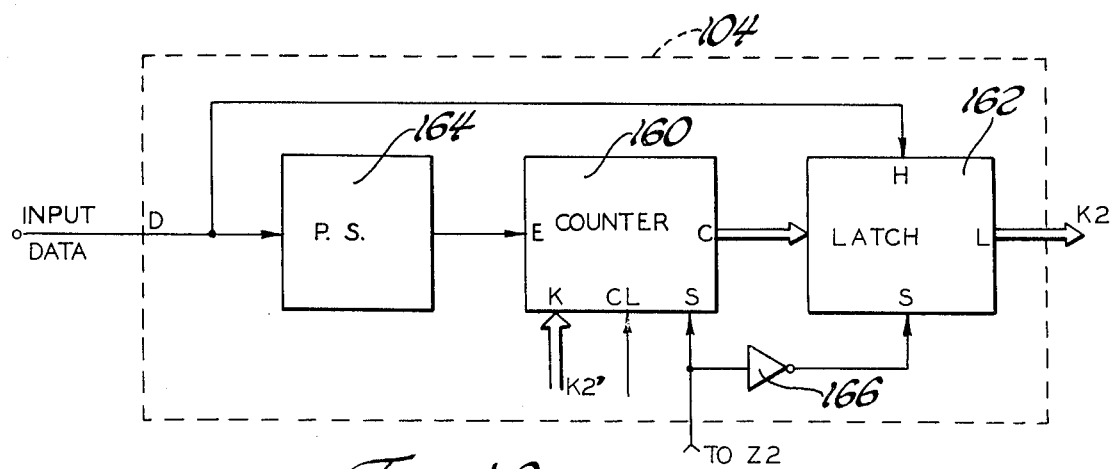
FIGS. 10 and 10a are measurement circuits.

The measurement circuit 104 is shown in FIG. 10. This measurement circuit takes the form of a count and latch circuit and comprises a counter 160, a latch 162 and a pulse stretcher 164. The data signal is applied to an input D at the input of the pulse stretcher 164 which functions to add a predetermined increment of time duration to each high level input pulse applied thereto. The purpose of the measurement circuit is to measure the width of a single bit, i.e. the bit time, and generate a time delay signal K2 for the clock pulses produced by the bit clock generators 110b, 110c and 110d. When the input data signal goes high, the output of the pulse stretcher goes high. The counter 160 has an enable input, E, connected with the output of the pulse stretcher and a clock input, CL, connected with clock 116. A high output from the pulse stretcher enables the counter 160 which has a parallel or binary word output C which is connected to the input of the latch 162. The latch output L is equal to the counter output until the output is latched, as described below. The latch produces an output, when latched, corresponding to the signal K2. The counter 160 has a presettable input K which is preset by a binary word having a value equal to K2'. The signal K2', as will be described below, is taken from the output of the other measurement circuit 102. The counter 160 also has a strobe input S which is connected with the Z2 output of the high level bit clock generator system 72 as shown in FIG. 5. Thus, the B2 timing signal serves as a strobe signal for the measurement circuit. The strobe signal is connected through an inverter 166 to a strobe input, S of the latch 162. The input D of the pulse stretcher is connected with a hold input H of the latch 162 whereby the output is latched to the output of the counter when the data signal goes low.

The operation of the measurement circuit 104 is as follows. When the data signal at input D goes high, the output of the pulse stretcher 164 goes high and this output is applied to the enable input E of the counter 160. The counter is enabled and starts counting the clock pulses from clock 116 which are applied at the clock input CL. The output of the counter 160 is applied to the input of the latch 162 and, in the absence of any strobe signal at the input S of the counter, the count appearing at the output of the latch is equal to the output of the counter 160. For reasons given below, no strobe signal will appear at the input S of the counter for a single bit data pulse; accordingly, in this case, the output of the counter and the latch continues to increase for the duration of the single bit data pulse. At the trailing edge of the single bit data pulse, i.e. when the data pulse goes low, the low signal at the input H of the latch 162 causes the circuit to latch and hold the accumulated count in the output of the latch. Thus, where the bit width is at the smallest expected value, the output signal of the latch, and hence the measurement circuit 104, is equal to a value K2 corresponding to a time duration of the single bit width. In other words, for this condition, the value of K2 is equal to twice the value of K1 and, in the example, K2 is equal to ten clock pulses. If the data rate is at a lower value, the counter 160 will count more clock pulses during a single bit width and the output of the measurement circuit will be of greater value, in proportion to the bit time. The pulse stretcher 164 is utilized only to keep the counter 160 enabled long enough to operate the latch after the data signal goes low.

In case the data signal applied to the input of the measurement circuit 104 is more than one bit wide, the output of the measurement circuit will be latched at a value K2' which is equal to a previous measurement. The value K2' is taken from the output of the measurement circuit 102, as indicated in FIG. 5. This is accomplished by use of the B2 timing signal from the bit clock generator system. As discussed above in connection with FIGS. 7 and 8, the bit clock generator 110b produces an output timing signal B2 whenever the data bit applied to the input is more than one bit wide (as measured with reference to the value of K2 which is being applied at that time to the bit clock generator). Accordingly, when the data pulse is greater than one bit wide, the timing pulse B2 will be applied to the strobe input of the counter 160. This will cause the count K2' at the preset input K to appear at the output C of the counter 160 and hence at the output of the latch 162. The value or count K2', being taken from the output of the measurement circuit 102, is equal to a previously measured value of a bit width. Thus, the output of the latch 162, upon strobing of the counter 160, becomes equal to the previously measured value; at this time, the strobe signal through the inverter 166 to the strobe input of the latch, causes the output of the latch to be held or latched at the previously measured value of bit width. Accordingly, the measurement is not updated except upon the occurrence of data pulses of a single bit width.

As mentioned above, if the data signal applied to the input of the measurement circuit 104 is more than one bit wide the output of the latch 162 is not updated; instead, the previously measured value of a bit width is produced at the output of the latch. This is the desired operation during a reading of a given code symbol. It results in updating of the value of K2, the measure of a single bit width, each time a single bit bar is encountered. No updating occurs when multiple bit width bars are encountered. This updating operation can occur after the width of a single bit bar is initially established for the code symbol being read. The value of the single bit width is initially established by measurement of the width of the first guard bar by means of the high level measurement circuit 104. To allow this initial measurement to be made, the circuit must recognize the occurrence of the first guard bar. The standard UPC code symbol is provided with a white margin at least 7 modules wide on both the left and right side of the symbol. Consequently, the first dark guard bar is always preceded by a light bar or margin which is greater in width than the guard bar itself. This relationship is utilized to establish the initial condition of the high level bit clock system 72. In particular, the low level measurement circuit 102 measures the width of the light space or margin preceding the first guard bar and the value, K2', is supplied to the high level bit clock system 72. In this high level bit clock system 72, any dark bar which is wider than the immediately preceding light bar or space will be interpreted as a dark bar greater than one bit wide, and hence not a guard bar. If a dark bar is narrower than the immediately preceding light bar or space, it will be interpreted as a dark bar of single bit width which might be a guard bar. In such case, the high level measurement circuit 104 will update the measured value of a single bit width. This obtains because the light space preceding the dark bar establishes the value of K2' which is used in the high level bit clock system 72 to determine whether the dark bar is of greater width than that represented by the value of K2', the width of the preceding light bar. If it is, the high level bit clock system produces a timing signal B2 which is applied to the strobe input of the high level measurement circuit 104 causing the output thereof to remain at the previously measured value K2'.

If, for some reason, a light space or margin preceding the first guard bar is, in fact, narrower than the first guard bar the initial value of K2' will be less than that of a bit width. Thus the high level bit clock system would produce a timing signal B2 and a valid reading could not be obtained from that particular beam scan of the symbol. Such a condition could result from a damaged code symbol. For example, a fly-speck or ink spot in the path of a scanning beam and close to the first guard bar would prevent a valid reading. The succeeding scan of the code symbol might miss the ink spot and produce a valid reading.

From the foregoing discussion, it will be understood that the high level bit clock system 72 must be initialized with a correct value of K2' in order to enable a valid reading of the code symbol. If the light margin or space preceding the first guard bar is wider than the guard bar then its measured value, K2', is a valid initializing value. If the light margin is narrower than the first guard bar, K2' will have an invalid initializing value.

The value of K2' which is used for initializing the high level bit clock system 72 is registered by the measurement circuit 102 which is basically the same as the measurement circuit 104 described above. As such, the measurement circuit 102 registers a value of K2' in a counter; if the margin preceding the first guard bar comprises a light space having a width great enough to cause the counter to overflow an invalid initializing value of K2' may be obtained. If, for example, the margin width caused the counter to become filled and then start counting up from zero so that the registered count represents a width less than the first guard bar, the value of K2' would be an invalid initiating value. To prevent this kind of false interpretation of a wide margin, the measurement circuit 102 is provided with an initializing or set-up circuit which will now be described with reference to FIG. 10*a*.

Figure 10A:
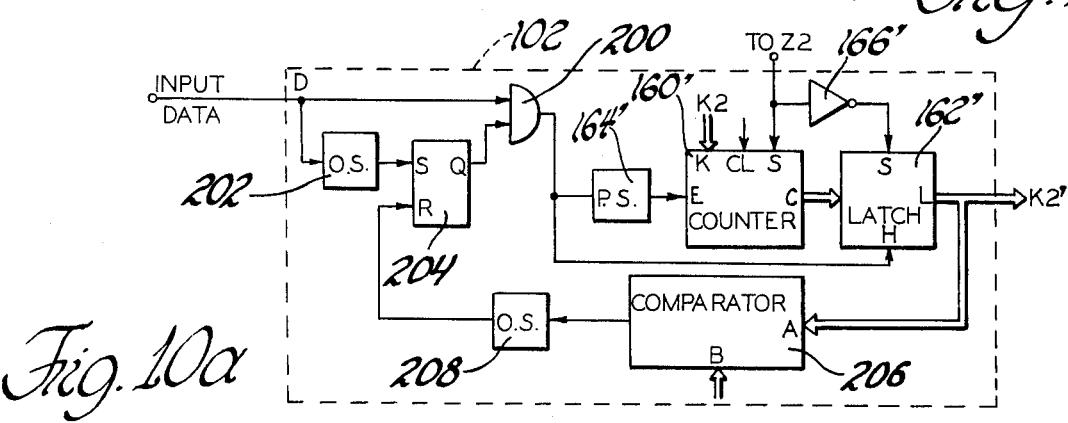

The measurement circuit 102, as shown in FIG. 10*a* comprises the same basic components as the measurement circuit 104 which was described above. In FIG. 10*a*, the components which are the same as those in FIG. 10 are designated by the same reference characters except that a prime symbol is added. Thus the basic measurement circuit in FIG. 10*a* comprises a pulse stretcher 164', a counter 160', a latch 162' and an inverter 166' all connected in the same configuration as described with reference to FIG. 10. The initializing circuit comprises an AND gate 200 having one input connected with the input D of the measurement circuit 102. The input data is applied, as shown in FIG. 5, through the inverter 76 to the input D. A one-shot multivibrator 202 has its input connected with the input D and its output is connected to the set input of an RS flip-flop 204. The Q output of the flip-flop 204 is connected to the other input of the AND gate 200. In this arrangement, the input data signal is applied through the AND gate 200 to the input of the pulse stretcher 164' as long as the AND gate is open; the gate is opened when the input data signal at input D goes high and it will remain open until the data signal goes low or until the flip-flop 204 is reset. For the purpose of controlling the flip-flop 204 according to the state of the counter 160', a comparator 206 is provided. The comparator has an input A connected with the output of the latch 162'. The comparator has a preset input B which is set to a value equal to the capacity of the counter 160'. For example, with an eight bit counter, the reset input B is set to a value of 256. The comparator 206 is of the type which goes high at its output when the count on input A becomes equal to the count on input B and remains high so long as A is equal to or greater than B. The output of the comparator 206 is applied to the input of a one-shot multivibrator 208 which has its output connected with the reset input of the flip-flop 204. When the output of the comparator 206 goes high the output of the one-shot 208 also goes high and the Q output of the flip-flop 204 goes low. The Q output of the flip-flop will remain low until the next input data pulse since the one-shot 202 responds only to a rising pulse.

The overall operation of the measurement circuit 102 is the same as that of circuit 104 provided that the margin preceding the first guard bar is not wide enough to cause the counter 160' to be filled to capacity. If the counter is filled to capacity the comparator 206 will go high causing one-shot 208 to go high and the flip-flop 204 will go low. This will close the gate 200 and the latch 162' will be latched at the registered count in the counter 160'. Thus the valve of K2' is established at the registered count and this latch output signal is applied as the initializing value to the K input of the high level bit clock system 72. This value of K2', as discussed above, is a valid initializing value and the high level bit clock system will produce no timing signal on the output Z2 in response to the first guard bar. Hence the measurement circuit 104 will not be strobed during the first guard bar and it will be allowed to obtain a measurement of the width of the first guard bar as the value of one-bit time for the existing data rate. Consequently the measurement circuit 104 will produce the output signal K2 which is applied to the low level bit clock system 74 as the delay signal for producing the timing signals corresponding to the multiple bit light bars.

SYSTEM OPERATION

Figure 11:
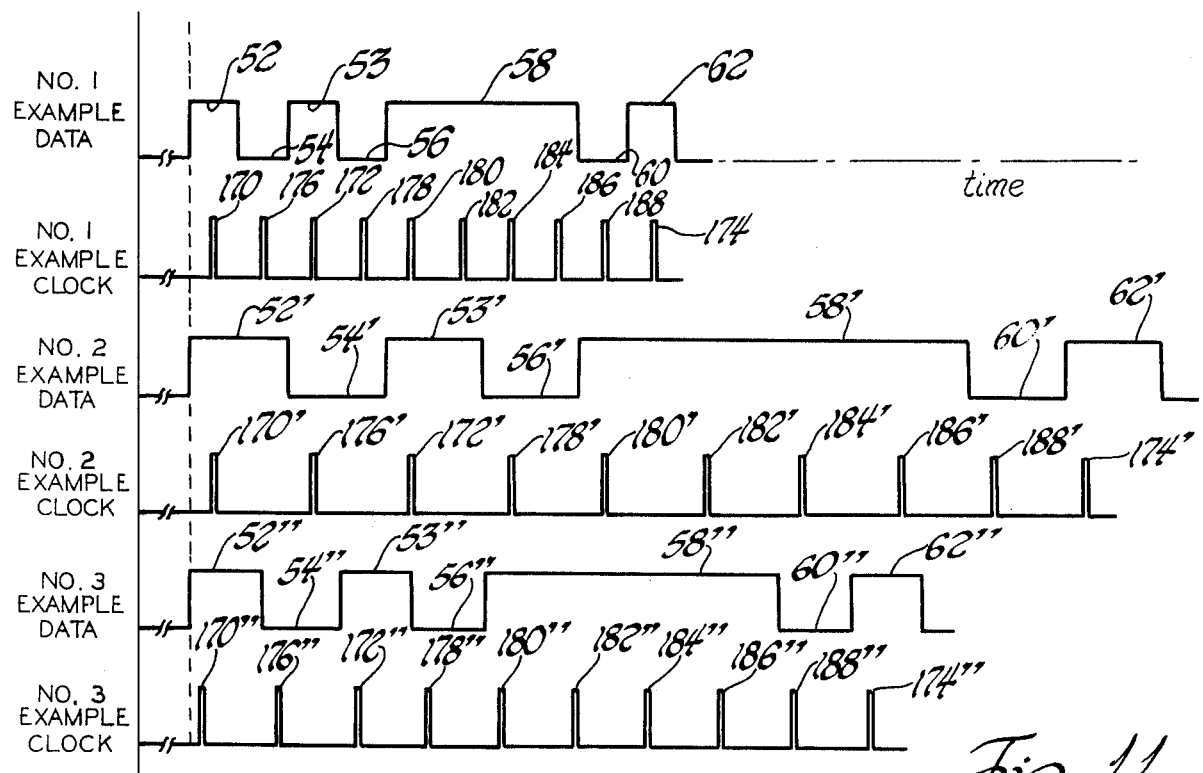
FIG. 11 is a timing diagram for explanatory purposes.

Referring not to FIGS. 5 and 11, the operation of the entire asynchronous to synchronous converter will be described. The operation will be explained by giving examples of generating clock signals for different data rates which are depicted in the timing diagram of FIG. 11 as "number 1 example," "number 2 example" and "number 3 example."

The number 1 example is a data signal which has a data rate equal to the highest expected rate which, of course, results in the smallest expected value of bit time. This example is identical to that depicted in the timing diagram of FIG. 8 wherein the guard bar pattern followed by the character number "3" is represented. The guard bar pattern includes the high level single bit pulses 52 and 53 representing the single bit width dark bars and the intervening low level single bit pulse 54 representing the single bit width light bar. The character number "3" is encoded as a one-bit wide light bar, a four-bit wide dark bar, a one-bit wide light bar, and a one-bit wide dark bar, in that order. This pattern is represented by the pulses 56, 58, 60 and 62. In this example, the maximum expected bit rate is two mega bits per second which corresponds to a bit time of 0.5 microseconds. The clock frequency of clock 116 is 20 MHz. which produces 20 clock pulses per microsecond or 10 clock pulses per bit time. The delay time for the first bit clock generator of both the high level bit clock system 72 and the low level bit clock system 74 is established at one-half bit time, or 5 clock pulses. This is established by the value of signal K1 which is applied to the input K of the bit clock generators 110a in the generator systems 72 and 74. Each of the other bit clock generators 110b, 110c and 110d have a delay time which is equal to the value of the signal applied to the preset input K of each bit clock generator. The value of the signal K1 is fixed whereas the value of the delay signals K2 and K2' is variable in accordance with the data rate as determined by the measurement circuits 104 and 102, respectively. The value of the delay signal at the highest expected data rate is established at one bit time, which in the example is 10 clock pulses from the clock 116. The value of the delay signal is increased in proportion to the increase in bit time. Thus, in the number 1 example of data rate depicted in FIG. 11, the clock pulse 170 occurs one-half bit time after the leading edge of the high level pulse 52 and is generated by the timing signal B1 from the bit clock generator 110a of the generator system 72. The same is true of clock pulse 172 and the clock pulse 174. The clock pulse 176, however, is generated by the timing pulse B1 of the bit clock generator 110a in the low level bit clock system 74. The same is true of clock pulse 178 and 188. It is observed at this point, that clock pulses 180, 182, 184 and 186 are generated for the four-bit wide data pulse 58. However, before discussing the generation of these pulses, it will be helpful to consider the operation of the measurement circuits 102 and 104.

The measurement circuits 102 and 104, as stated above, operate to measure the width, in units of time, of data pulses which are one bit wide. When a code symbol is scanned by the optical reader, the data signal starts with a low level portion representing the light margin or space preceding the first guard bar. This margin in the standard symbol is seven modules wide and is measured by the measurement circuit 102 to produce an initializing value of K2' for the high level bit clock system 72. To be valid, this value of K2' must be greater than the width of the first guard bar, as discussed above, to prevent the timing signal B2 from the bit clock system 72 from strobing the measurement circuit 104 which would prevent a measurement of the first guard bar. In the number 1 example, the data pulse 52 represents the first dark guard bar and is the first high level pulse to be applied to the high level bit clock system 72 and the measurement circuit 104. The measurement circuit 104 will produce an output signal K2 which is equal to the number of clock pulses from clock 116 which occur in the time of the pulse 52 which, in number 1 example, is 10 clock pulses. If data pulse 52 were wider the output signal K2 would have a number of clock pulses proportional to its width. Therefore, the first guard bar pulse 52 causes the measurement circuit 104 to produce an output signal K2 which is equal to the bit width, i.e. 10 clock pulses, and this signal is latched at the output L. This signal K2 is applied to the input K of the measurement circuit 102 and to the input K of the low level bit clock system 74. The succeeding low level pulse 54 of the guard bar pattern is inverted by the inverter 76 and appears as a high level pulse at the input D of the measurement circuit 102. This causes the measurement circuit 102 to produce an output signal K2' equal to the number of clock pulses which occur during the low level pulse 54 which, in the number 1 example, is 10 pulses. (There will be no strobe signal input to the measurement circuit 102 because low level pulse 54 is only one bit wide, as measured with reference to high level pulse 52 which set the value of the signal K2 at the input K of the low level bit clock system 74.) The output signal K2' from the measurement circuit 102 is applied to the input K of the high level bit clock system 72 and to the input K of the measurement circuit 104. It is observed that the current reference value, signal K2, for the low level bit clock system 74 and the low level measurement circuit 102 is set up by the output of the high level measurement circuit 104; similarly, the current reference value for bit time, signal K2', for the high level bit clock system 72 and high level measurement circuit 104 is set up by the output of the low level measurement circuit 102. It is further observed, with this criss-cross connection of the high level and low level circuits, that the current reference values for bit time for both high level and low level pulses, are established after the occurrence of the first guard bar pulses 52 and 54.

In the manner just described, the time delay signals K2 and K2' are established by the measurement circuits in response to the guard bar pattern. These signals represent the current value of bit time and will be updated by each succeeding single bit pulse in the data signal. In the UPC code there are approximately 33 single bit bars in each code symbol, in addition to the guard bars and therefore the bit time is measured and re-established that many times while a code symbol is being read.

Clocking of the multiple bit pulse 58, alluded to above, is now enabled by reason of the setting of the time delay signals K2 and K2' which represent the value of bit time. The pulse 58 as described with reference to FIG. 8, causes the bit clock generator 110a (in high level bit clock system 72) to produce the clock pulse 180 one-half bit time (5 clock pulses of clock 116) after the leading edge of pulse 58. The timing pulse B1 produced by the bit clock generator 110a is applied to the input of the bit clock generator 110b which has the time delay signal K2' applied to its input K. Accordingly, the bit clock generator 110b will produce the timing signal B2 one bit time after the leading edge of the timing signal B1. Timing signal B2 causes the generation of clock pulse 182 one bit time (10 clock pulses from clock 116) after clock pulse 180. Also timing signal B2 serves as a strobe signal to the measurement circuit 104. This strobe input to measurement circuit 104 functions to prevent a change of the time delay signal K2' in response to the multiple bit width pulse 58. This is done, as described above, by strobing the counter 160 and the latch 162 with the timing signal B2 to cause the signal D2 from the measurement circuit 104 to appear at the output L of the measurement circuit 102. Thus when the data pulse is more than one bit wide it is not effective to update the output of the measurement circuits. Consequently, the current reference value of bit widths, i.e. the time delay signal K2, is held at the previously measured value of bit time throughout the clocking of the multiple bit pulse 58. The bit clock generator 110c thus causes the clock pulse 184 to be produced one bit time (10 clock pulses from clock 116) after clock pulse 182. Similarly, bit clock generator 110d causes clock pulse 186 to be produced one bit time after clock pulse 184. This completes the explanation of the generation of the clock pulses for the number 1 example with the data rate at the highest expected value.

FIG. 11 shows a second example of a data signal and the clock pulses generated for it by the subject invention. The data signal is identified as "number 2 example data" which is exactly the same data as that in the number 1 example but the data rate is slower. In particular, the number 2 example has a bit time which is exactly twice as long as that for the number 1 example. The data pulses and the clock pulses of the number 2 example are given reference characters the same as those in the number 1 example except that a prime symbol is added. In the case of the one bit data pulses, the corresponding clock pulses will lag in time by the same preset time delay signal value K1, namely 5 clock pulses of clock 116. As previously described, the clock pulses for the multiple bit data pulses are timed by both the fixed time delay signal K1 and the variable time delay signal K2. The measurement circuits 102 and 104 will produce time delay signals K2' and K2, respectively, which have a value equal to 20 clock pulses of clock 116. Accordingly, for the multiple bit data pulse 58', the bit clock generator 110a will cause the clock pulse 180' to lag by 5 clock pulses of clock 116; bit clock generator 110b will cause the clock pulse 182' to lag the clock pulse 180' by 20 clock pulses of clock 116. Similarly, clock pulse 184' and 186' will be caused to occur at time intervals of 20 clock pulses of clock 116.

In the third example illustrated in FIG. 11, the data rate is taken at 1.5 times the highest expected data rate. The data pulses of "number 3 example data" and the clock pulses of "number 3 example clock" are given reference characters the same as the number 1 example that the double prime symbol has been added. In this case, the preset value of the time delay signal K1 remains the same at 5 clock pulses of clock 116. The value of the variable time delay signal K2 and K2' is reset by the timing circuits 104 and 102, respectively, at a value equal to 15 clock pulses of clock 116. Accordingly, the clock pulses corresponding to the one bit data pulses will lag the data pulses by 5 clock pulses of clock 116. The multiple bit data pulse 58' will be clocked as follows. The clock pulse 180' for the first bit will lag the pulse 58' by 5 clock pulses of clock 116; clock pulse 182" for the second bit will lag the clock pulse 180" by 15 clock pulses of clock 116; clock pulses 184" and 186" for the third and fourth bits will occur at intervals of 15 clock pulses of clock 116.

From the foregoing, it will be observed that the clock pulses are produced for each given data rate at regular time intervals. In the example, the time delay for the first bit clock generator is taken at one-half bit time of the highest expected data rate and the delay time for the second, third and fourth bit clock generators is automatically set at a full bit time. Accordingly, regardless of the data rate, the clock pulses will occur for each bit in the data signal with a time delay equal to one-half bit time measured at the highest expected data rate. In other words, in the exemplary embodiment, the leading edge of the clock pulse occurs 5 clock pulses of clock 116 after the initiation of the corresponding data bit.

Although the description of this invention has been given with reference to a particular embodiment it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A clock pulse generator for producing clock pulses in synchronism with data bits of a non-return-to-zero code being transmitted at a variable data rate as a stream of high and low level data pulses each of which represents one or more bits, each data word including a prefix having at least one pulse representing a predetermined number of bits, said generator comprising a master clock, a bit clock system including a set of bit clock generators connected in cascade with the first bit clock generator being connected with a source of data pulses, said first bit clock generator being connected with the master clock and with said source of data pulses for producing a first timing signal when a data pulse has a duration which exceeds a value corresponding to a first predetermined time interval, each of the remaining bit clock generators being connected with the master clock and with the output of the preceding clock generator for producing a succeeding timing signal when said data pulse has a duration which exceeds a second predetermined time interval, said first predetermined time interval being equal to one-half bit time of a data pulse, said second predetermined time interval for a given one of the remaining bit clock generators being equal to one bit time greater than the predetermined time interval for the preceding bit clock generator, measurement means connected with said source of data pulses and including means for measuring the time duration of the prefix pulse to produce a measurement signal having a value corresponding to the bit time at the existing data rate, said measurement means being connected with said remaining bit clock generators for applying said measurement signal thereto, and a clock pulse generating circuit connected with the output of each of said bit clock generators for producing a clock pulse corresponding to each timing signal, and gate means having inputs connected with said clock pulse generating circuit for producing a serial stream of said clock pulses.

2. The invention as defined in claim 1 wherein said first bit clock generator comprises a first preset counter having an enabling input adapted to be connected with said source of data pulses, a first comparator having one input connected with the output of said counter, said master clock being connected with a clock input of said counter, time delay signal means for producing a signal corresponding to said first predetermined time interval, said time delay signal means being connected with the preset input of said counter and with the other input of said comparator whereby said comparator produces an output timing signal when the count of the clock pulses from the master clock equals said time delay signal and means for sustaining said output timing signal for the duration of the input data pulse.

3. The invention as defined in claim 2 wherein each of the remaining bit clock generators comprises a second preset counter having an enabling input connected with the output of the preceding bit clock generator, a second comparator having one input connected with the output of said second preset counter, said master clock being connected with a clock input of said second preset counter, said second preset counter having a preset input connected with the output of said measurement means, said second comparator having another input connected with said preset input of said second preset counter whereby said second comparator produces an output timing signal when the count of the clock pulses from the master clock equals said preset input of the second preset counter, and means for sustaining said output timing signal for the duration of the input data pulse.

4. The invention as defined in claim 1 wherein said measurement means comprises a third preset counter and a latch, a pulse stretcher connected with an enabling input of said third preset counter and being adapted to be connected with said source of data pulses, the output of said third preset counter being connected with the input of said latch, said third preset counter having a preset input, means for setting said preset input of the third preset counter to a value corresponding to a previously measured value of bit time, said third preset counter having a clock input, a master clock connected with the clock input, said third preset counter having a strobe input connected with the output of the second bit clock generator whereby the output of said third preset counter will appear at the output of said latch unless and until a timing signal from the second bit clock generator is applied to said strobe input to cause the signal at the preset input of the third preset counter to appear at the output thereof and at the output of said latch.

* * * * *